(12) United States Patent
Sato et al.

(10) Patent No.: US 11,718,307 B2
(45) Date of Patent: Aug. 8, 2023

(54) VEHICLE CONTROL APPARATUS

(71) Applicant: SUBARU CORPORATION, Tokyo (JP)

(72) Inventors: Fumiya Sato, Tokyo (JP); Hideyuki Takao, Tokyo (JP); Yui Ota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/400,199

(22) Filed: Aug. 12, 2021

(65) Prior Publication Data

US 2022/0063634 A1 Mar. 3, 2022

(30) Foreign Application Priority Data

Aug. 27, 2020 (JP) ................................ 2020-143196

(51) Int. Cl.
*B60W 40/06* (2012.01)
*B60W 40/09* (2012.01)
(Continued)

(52) U.S. Cl.
CPC ............ *B60W 40/09* (2013.01); *B60W 40/06* (2013.01); *B60W 50/00* (2013.01); *G06V 20/597* (2022.01);
(Continued)

(58) Field of Classification Search
CPC .... G06V 20/597; B60W 40/06; B60W 50/00; B60W 2050/0054
See application file for complete search history.

(56) References Cited

U.S. PATENT DOCUMENTS

2019/0147267 A1\* 5/2019 Aizawa ................ G06V 20/597
 340/576
2019/0243364 A1\* 8/2019 Cohen .................... G06V 20/20
(Continued)

FOREIGN PATENT DOCUMENTS

JP 2004-138549 A 5/2004
JP 2006-46936 A 2/2006
(Continued)

*Primary Examiner* — Benyam Haile
(74) *Attorney, Agent, or Firm* — Troutman Pepper Hamilton Sanders LLP

(57) ABSTRACT

A vehicle control apparatus to be applied to a vehicle includes a driver state-value detection processor, a road-surface-state detection processor, a threshold setting processor, a dangerous-driving determination processor, and a determination threshold changing processor. The driver state-value detection processor detects a state value of a driver who drives the vehicle. The road-surface-state detection processor detects a road-surface state of a road on which the vehicle is traveling. The threshold setting processor decides, based on the state value, one or more determination thresholds of a state to be determined as occurrence of dangerous driving. The dangerous-driving determination processor determines that the dangerous driving is occurring in a case where the state value is present within a range outside any of the one or more determination thresholds for a predetermined time period or more. The determination threshold changing processor changes the one or more determination thresholds based on the road-surface state.

16 Claims, 9 Drawing Sheets

(51) Int. Cl.
  B60W 50/00  (2006.01)
  G06V 20/59  (2022.01)
  G06V 40/10  (2022.01)
  G06V 40/16  (2022.01)
  B60W 40/08  (2012.01)
(52) U.S. Cl.
  CPC ............ G06V 40/10 (2022.01); G06V 40/161 (2022.01); *B60W 2040/0818* (2013.01); *B60W 2050/0054* (2013.01); *B60W 2540/229* (2020.02)

(56) References Cited

U.S. PATENT DOCUMENTS

| | | | |
|---|---|---|---|
| 2019/0299948 A1* | 10/2019 | Maeda | B60T 8/171 |
| 2020/0198649 A1* | 6/2020 | Emura | G08G 1/16 |
| 2020/0254922 A1* | 8/2020 | Kubitza | B60Q 1/08 |
| 2020/0293800 A1 | 9/2020 | Yoshimura et al. | |
| 2020/0327345 A1* | 10/2020 | Schumacher | G06V 20/40 |

FOREIGN PATENT DOCUMENTS

| | | |
|---|---|---|
| JP | 2009-116394 A | 5/2009 |
| JP | 2013-61690 A | 4/2013 |
| JP | 2015-38516 A | 2/2015 |
| JP | 5843833 B2 | 1/2016 |
| JP | 6143902 B2 | 10/2018 |
| JP | 6413902 B2 | 10/2018 |
| JP | 2019-105872 A | 6/2019 |

* cited by examiner

| ROAD-SURFACE STATE | LEFT-RIGHT RANGE | | UPPER-LOWER RANGE | |
|---|---|---|---|---|
| | RIGHT RANGE | LEFT RANGE | UPPER RANGE | LOWER RANGE |
| DRY (SUNNY/CLOUDY) | 0~+25° | 0~−25° | 0~+20° | 0~−20° |
| WET (MOIST) | 0~+20° | 0~−20° | 0~+15° | 0~−15° |
| SNOW (SNOWY) | 0~+15° | 0~−15° | 0~+10° | 0~−10° |
| ICE (FROZEN) | 0~+10° | 0~−10° | 0~+5° | 0~−5° |

FIG. 7

| ROAD-SURFACE STATE | HEART RATE (bpm) | | |
|---|---|---|---|
| | INATTENTIVE ZONE | SAFE ZONE | |
| DRY (SUNNY/CLOUDY) | LESS THAN T−20%, MORE THAN T+20% | WITHIN T±20% | |
| WET (MOIST) | LESS THAN T−15%, MORE THAN T+15% | WITHIN T±15% | |
| SNOW (SNOWY) | LESS THAN T−10%, MORE THAN T+10% | WITHIN T±10% | |
| ICE (FROZEN) | LESS THAN T−5%, MORE THAN T+5% | WITHIN T±5% | |

| ROAD-SURFACE STATE | BLINKING | | |
|---|---|---|---|
| | INATTENTIVE ZONE | SAFE ZONE | |
| DRY (SUNNY/CLOUDY) | LESS THAN T−20%, MORE THAN T+20% | WITHIN T±20% | |
| WET (MOIST) | LESS THAN T−15%, MORE THAN T+15% | WITHIN T±15% | |
| SNOW (SNOWY) | LESS THAN T−10%, MORE THAN T+10% | WITHIN T±10% | |
| ICE (FROZEN) | LESS THAN T−5%, MORE THAN T+5% | WITHIN T±5% | |

FIG. 8

VEHICLE CONTROL APPARATUS

CROSS-REFERENCE TO RELATED APPLICATION

The present application claims priority from Japanese Patent Application No. 2020-143196 filed on Aug. 27, 2020, the entire contents of which are hereby incorporated by reference.

BACKGROUND

The technology relates to a vehicle control apparatus.

A vehicle such as an automobile as transportation is highly convenient and allows for trips to various places. During such traveling, a driver driving the vehicle may find an interesting object outside the vehicle and stare at the object too much in some cases. Such a situation is sometimes referred to as inattentive driving. In other cases, the driver may get drowsy due to his or her physical condition.

SUMMARY

An aspect of the technology provides a vehicle control apparatus to be applied to a vehicle. The vehicle control apparatus includes a driver state-value detection processor, a road-surface-state detection processor, a threshold setting processor, a dangerous-driving determination processor, and a determination threshold changing processor. The driver state-value detection processor is configured to detect a state value of a driver who drives the vehicle. The road-surface-state detection processor is configured to detect a road-surface state of a road on which vehicle is traveling. The threshold setting processor is configured to decide, on the basis of the state value of the driver, one or more determination thresholds of a state to be determined as occurrence of dangerous driving. The dangerous-driving determination processor is configured to determine that the dangerous driving is occurring in a case where the state value of the driver is present within a range outside any of the one or more determination thresholds for a predetermined time period or more. The determination threshold changing processor is configured to change the one or more determination thresholds on the basis of the road-surface state.

An aspect of the technology provides a vehicle control apparatus to be applied to the vehicle. The vehicle control apparatus includes circuitry. The circuitry is configured to detect a state value of a driver who drives the vehicle. The circuitry is configured to detect a road-surface state of a road on which vehicle is traveling. The circuitry is configured to decide, on the basis of the state value of the driver, one or more determination thresholds of a state to be determined as occurrence of dangerous driving. The circuitry is configured to determine that the dangerous driving is occurring in a case where the state value of the driver is present within a range outside any of the one or more determination thresholds for a predetermined time period or more. The circuitry is configured to change the one or more determination thresholds on the basis of the road-surface state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 7 is a schematic diagram illustrating an example of a determination threshold table in which determination thresholds are to be selected in accordance with the road-surface state.

FIG. 8 is a schematic diagram illustrating another example of the determination threshold table in which the determination thresholds are to be selected in accordance with the road-surface state.

DETAILED DESCRIPTION

Figure 1:
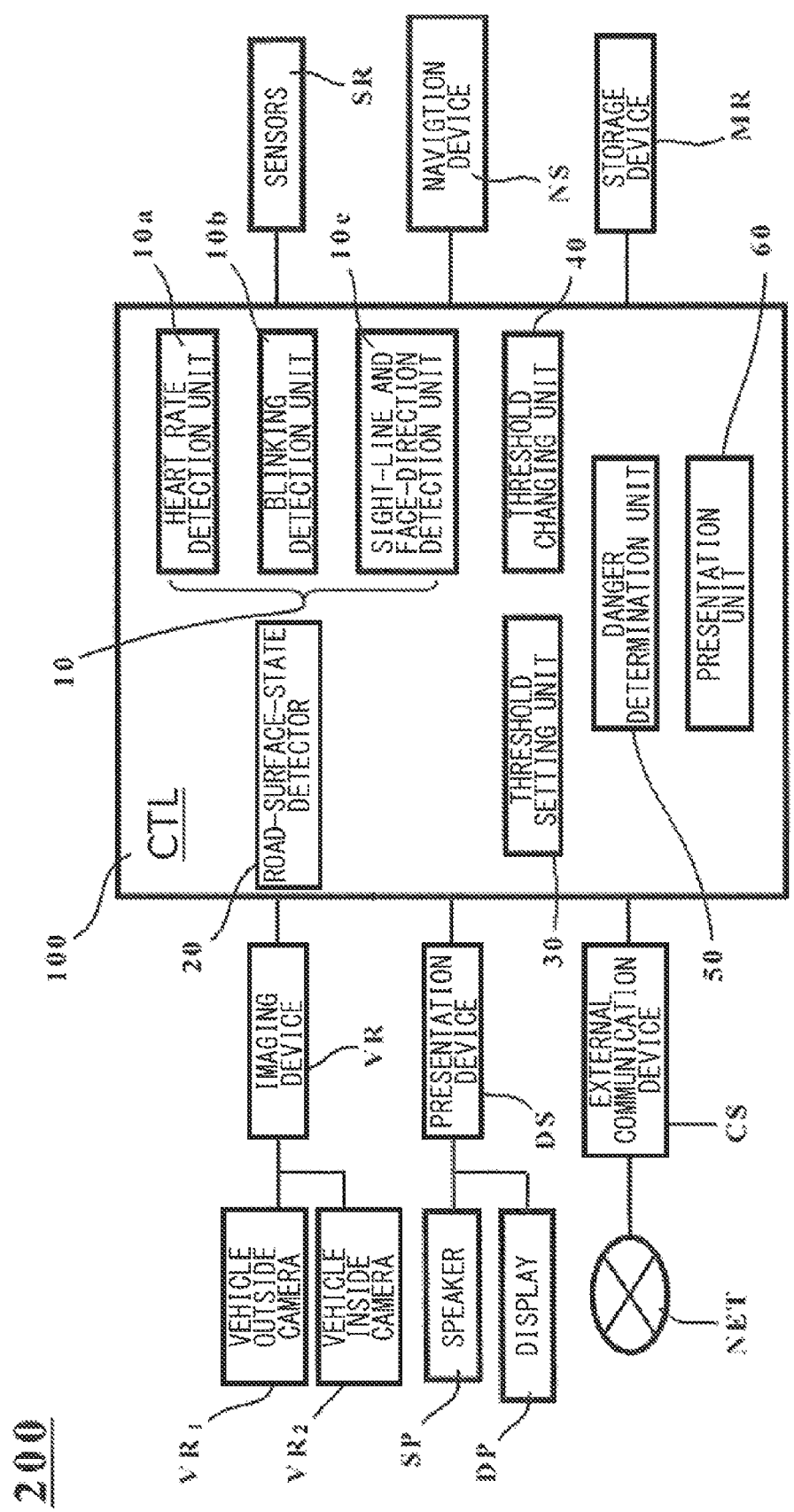
FIG. 1 is a block diagram illustrating an example of a general configuration of a vehicle.

For example, Japanese Unexamined Patent Application Publication (JP-A) No. 2019-105872 discloses an apparatus that detects an inattentive state of a driver that may lead to an accident. Examples of the inattentive state of the driver may include a drowsy state of the driver during driving and a state of the driver looking in an inappropriate direction during driving. The system disclosed in JP-A No. 2019-105872 operates on the basis of information only of the driver. Therefore, the system performs determination under the same condition, for example, even in a case where a situation of a road surface in front of a vehicle is more dangerous than usual. Examples of such a situation of the road surface may include a smaller friction coefficient.

Japanese Unexamined Patent Application Publication (JP-A) No. 2009-116394 discloses a vehicle alarm apparatus that detects a traveling environment, such as a situation of a road surface on which an own vehicle is traveling, and calculates an estimation time period for contact of the own vehicle with an obstacle. For example, JP-A No. 2009-116394 proposes to change a predetermined time period for calculating the estimation time period for contact to be longer in a case with bad weather than in a case with fine weather to alarm the driver.

The existing techniques including those disclosed in JP-A Nos. 2019-105872 and 2009-116394 still have room to appropriately meet the needs in the market, and may involve the following issue.

For example, the technique disclosed in JP-A No. 2019-105872 determines the inattentive state only on the basis of the information obtained from the driver, as described above. The technology may therefore involve a possibility that the determination is inappropriate depending on the situation of the road surface, for example. The technique disclosed in JP-A No. 2009-116394 simply changes the predetermined time period in a case where the estimation time period for contact of the own vehicle is shorter than the predetermined time period and where a sight line of the driver is not directed to the obstacle. This technique therefore does not change the reference for the obstacle itself which may come into contact with the own vehicle.

It is desirable to provide a vehicle control apparatus that is able to appropriately present occurrence or non-occurrence of dangerous driving to a driver in accordance with various traveling environments. Examples of the dangerous driving may include driving in a case where the driver is drowsy or driving in a case where the driver is looking in an inappropriate direction. Examples of the traveling environment include a road-surface state.

In the following, some example embodiments of the technology are described. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. Configurations other than those described in detail below may be appropriately supplemented with known vehicle structures and systems including various known on-vehicle sensors. For example, to detect a sight line of a driver or to determine a staring region of the driver, a sight-line following technique exemplified in Japanese Unexamined Patent Application Publication (JP-A) No. 2008-018853 or No. 2013-255168 may be applicable as long as such application of the technique does not contradict the gist of the embodiment of the technology.

FIG. 1 is a block diagram illustrating a general configuration of a vehicle 200 according to an example embodiment of the technology. The following description refers to a four-wheel-drive automobile as an example of a vehicle according to the embodiment; however, the embodiment may be applied to any other vehicle such as a motorcycle or an aircraft as long as such application does not inhibit the gist of the embodiment of the technology.

The vehicle 200 may include, for example but not limited to, an imaging device VR, a presentation device DS, an external communication device CS, sensors SR, a navigation device NS, a storage device MR, and a control apparatus 100.

According to the example embodiment, the imaging device VR may include a vehicle outside camera $VR_1$ and a vehicle inside camera $VR_2$. The vehicle outside camera $VR_1$ may be a known on-vehicle camera that includes one or more cameras and is adapted to shooting outside the vehicle that are configured to, for example, acquire an image of a road surface on which the vehicle 200 travels and to perform imaging of surroundings of the vehicle 200. In one example, such vehicle outside camera $VR_1$ may include a known inclination mechanism that allows for all-direction shooting of the outside of the vehicle. Examples of the inclination mechanism may include a pan mechanism or a tilt mechanism. Note that, however, the inclination mechanism is not necessarily provided. In one example, the vehicle outside camera $VR_1$ may include two or more wide-angle cameras that allow for imaging of the front, the rear, the left, and the right independently of each other.

The vehicle inside camera $VR_2$ may include one or more cameras adapted to perform imaging of a face of an occupant. According to the example embodiment, it may be sufficient that the vehicle inside camera $VR_2$ is configured to perform imaging at least of a face of the driver. However, in another example embodiment, the vehicle inside camera $VR_2$ may detect a face of each of the occupants present in the vehicle 200. In such a case, for example, two or more vehicle inside cameras $VR_2$ may be installed, corresponding to the respective occupants. For example, the vehicle inside cameras $VR_2$ for a driver's seat, a passenger seat, a left rear seat, and a right rear seat may be provided. As the vehicle inside camera $VR_2$, a known vehicle inside camera that acquires an image of a face of an occupant with use of visible light or infrared light may be applicable.

The presentation device DS may include a speaker SP and a display DP in the example embodiment. The speaker SP and the display DP may be a known speaker and a known display to be mounted on a vehicle, respectively. The display DP may be also used as a monitor of the navigation device NS which will be described later. The presentation device DS according to the example embodiment may be configured to perform near field communication with a mobile device such as a smartphone of the occupant.

The external communication device CS may include, for example, a known communication device that is configured to perform various types of information communication with external devices by means of a technique such as packet communication using the above-described smartphone or a next-generation automobile wireless communication technique represented by a connected service. The external communication device CS may be thus configured to perform various types of information communication via a known network NET such as the Internet, for example.

The sensors SR may include known on-vehicle sensors including, without limitation, a known speed sensor detecting a speed of the vehicle, a known acceleration sensor detecting acceleration, and a known steering angle senor detecting a steering angle. As some examples of the sensors SR, the vehicle 200 according to the example embodiment may include a road-surface temperature sensor detecting a road-surface temperature of the road surface, a roughness detection sensor configured to detect roughness of the road surface, and a moisture amount sensor configured to detect a moisture amount of the road surface, which will be described later.

In one example, any of various known temperature sensors may be applied as the road-surface temperature sensor detecting the road-surface temperature. For such known temperature sensors, reference may be made to Japanese Unexamined Patent Application Publication No. 2015-038516. In one example, any of various known methods and devices may be applied as the roughness detection sensor configured to detect roughness of the road surface. Examples of such known methods and devices may include a device (a road-surface roughness detection sensor) disclosed in Japanese Unexamined Patent Application Publication No. 2004-138549 and the method and the device disclosed in Japanese Unexamined Patent Application Publication No. 2013-061690. In one example, any of various known moisture-amount detection sensors may be applied as the moisture amount sensor configured to detect the moisture amount of the road surface. For such known moisture-amount detection sensors, reference may be made to Japanese Unexamined Patent Application Publication No. 2006-046936.

As some other examples of the sensors SR, the vehicle 200 according to the example embodiment may include a friction coefficient measurement sensor configured to calculate a friction coefficient of the road surface in one example. As such a friction coefficient measurement sensor, any of various known measurement devices may be applicable. As such known measurement devices, reference may be made to Japanese Patent Publication Nos. 5843833 and 6413902.

The navigation device NS may include a built-in unit such as a GPS unit adapted to acquire position information of the vehicle and information such as map information of, for example but not limited to, names of the regions and buildings.

The storage device MR may include, for example but not limited to, a known hard disk drive or a known non-volatile memory. The storage device MR may include various databases, a dangerous driving determination program, and any other known on-vehicle program installed thereon. Examples of the various databases may include a determination threshold table which will be described later. The storage device MR may manage and store the above-described databases and programs.

Next, a detail description is given of a configuration of the control apparatus 100 of the vehicle 200 according to the example embodiment.

Referring to FIG. 1, the control apparatus 100 according to the example embodiment may be a known computer provided with devices including, without limitation, a calculator and a memory. The control apparatus 100 may include a driver state-value detector 10, a road-surface-state detector 20, a threshold setting unit 30, a threshold changing unit 40, a danger determination unit 50, and a presentation unit 60.

In one embodiment, the driver state-value detector 10 may serve as a "driver state-value detection processor". The driver state-value detector 10 detects a state value of the driver. The state value of the driver may be a parameter to be used to determine occurrence or non-occurrence of dangerous driving according to the example embodiment. In other words, the state value of the driver may be referred to as a "movement range of a movement correlated to an attention level of the driver". Examples of the state value of the driver may include a sight line of the driver, a direction of a face of the driver, a heart rate of the driver, and the number of blinking by the driver. However, the state value of the driver is not limited thereto. Any movement correlated to the attention level of the driver upon determination of the occurrence of the dangerous driving may be applicable as the state value of the driver. FIG. 1 illustrates an example configuration in which the driver state-value detector 10 includes a heart-rate detection unit 10a, a blinking detection unit 10b, a sight-line and face-direction detection unit 10c.

The sight line, the direction of the face, and the like of the driver may be extracted from an image of the face of the driver by appropriately using a device such as the vehicle inside camera $VR_2$ described above. For such detection of the sight line, the direction of the face, and the like of the driver, a known analysis technique may be applicable without particular limitation, for example. For example, reference may be made to "Yasuhiro Ono, Takahiro Okabe, Yoichi Sato, "Gaze Estimation from Low Resolution Images", The IEICE transactions on information and systems, Vol. J90-D, No. 8, p. 2212-2222, 2007" described in JP-A No. 2013-255168. Other than the technique described therein, an existing analysis technique such as detection of the sight line, the direction of the face, and the like based on feature extraction of a face may be used.

In one embodiment, the road-surface-state detector 20 may serve as a "road-surface-state detection processor". The road-surface-state detector 20 detects a state of a road surface on which the vehicle 200 travels, i.e., the road-surface state. For example, the road-surface-state detector 20 may set or determine the road-surface state from matrix data illustrated in FIG. 4 on the basis of information received from the road-surface temperature sensor, the roughness detection sensor, and the moisture amount sensor described above.

Figure 4:
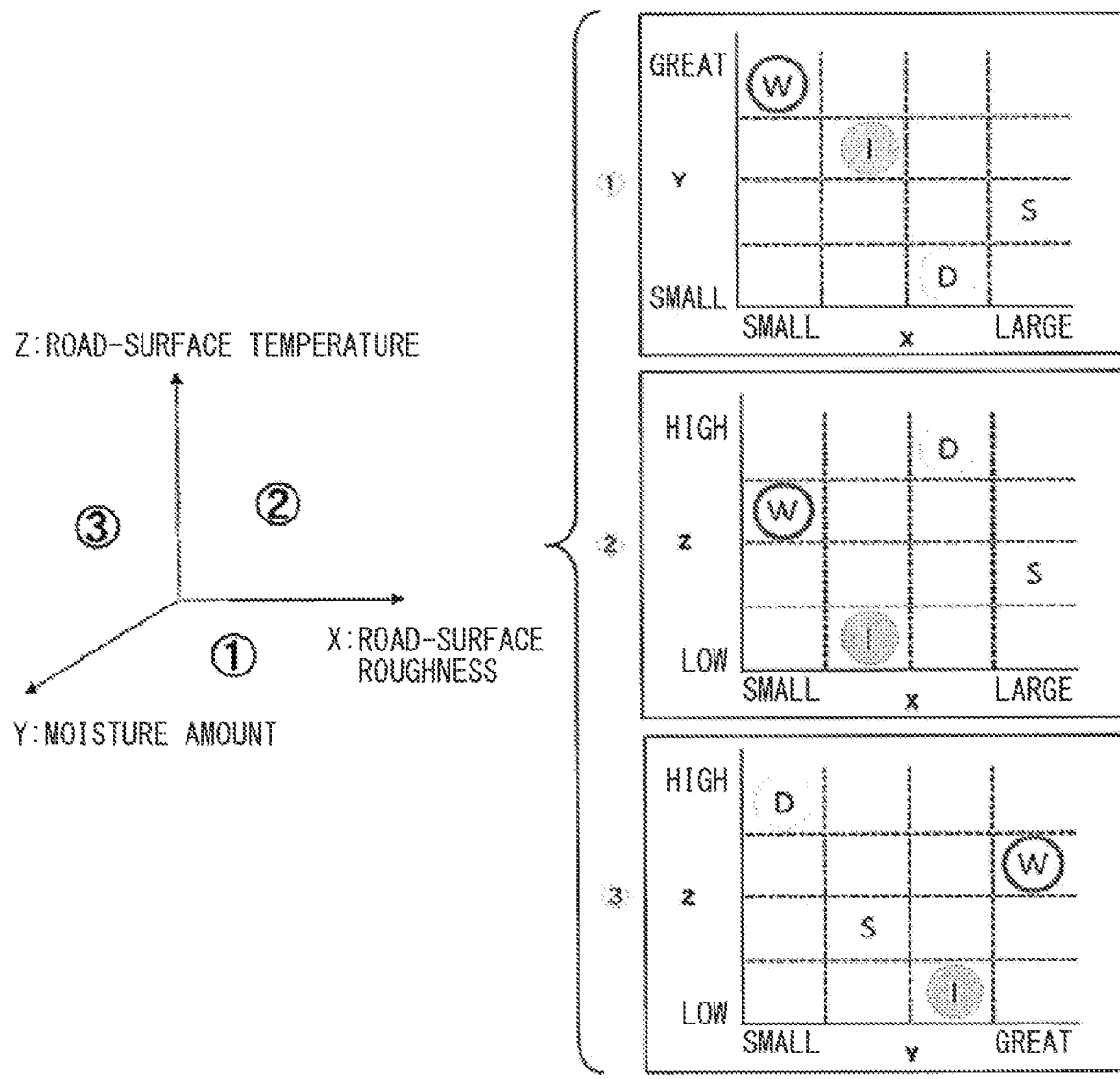
FIG. 4 is a schematic diagram illustrating an example of determining a road-surface state on the basis of a temperature, roughness, and a moisture amount of a road surface where the vehicle travels.

That is, as illustrated in FIG. 4, the road-surface-state detector 20 may hold values for four types of states derived from a matrix of a relationship between the road-surface temperature, the road-surface roughness, and the road-surface moisture amount prepared in advance. The four types of states may be, for example but not limited to, D (DRY), W (WET), S (SNOW), and I (ICE). Upon traveling of the vehicle 200, the road-surface-state detector 20 may thus be able to determine which of the four types of states corresponds to the road-surface state on the basis of data of the road-surface temperature, the road-surface roughness, and the road-surface moisture amount actually measured by the road-surface temperature sensor, the roughness detection sensor, and the moisture amount sensor described above, respectively.

According to the example embodiment, the road-surface-state detector 20 may determine the road-surface state from the four types of states set in advance on the basis of the relationship between the road-surface temperature, the road-surface roughness, and the road-surface moisture amount described above. However, the method of determining the road-surface state is not limited thereto. For example, in a case where the vehicle 200 includes the device or the sensor configured to measure the friction coefficient of the road surface described above, the types of states of the road-surface state may be set on the basis of the measured friction coefficient.

In a case where the types of states of the road-surface state are set on the basis of the magnitude of the friction coefficient, the types of states may not be limited to the four types of states described above. For example, the types of states may be set on the basis of finer numerical ranges. In such a case, for example, respective determination thresholds of a safe zone SZ and an inattentive zone CZ which will be described later may be controlled to be varied linearly. Further, in a case where the traveling environment markedly changes, the respective determination thresholds of the safe zone SZ and the inattentive zone CZ may be controlled to be varied moderately. Examples of the case where the traveling environment markedly changes may include a case where the vehicle 200 passes through a tunnel.

In one embodiment, the threshold setting unit 30 may serve as a "threshold setting processor". The threshold setting unit 30 may decide, on the basis of the state value of the driver, one or more determination thresholds of a state to be determined as occurrence of dangerous driving. For example, the threshold setting unit 30 according to the example embodiment may set the safe zone SZ and the inattentive zone CZ each having a predetermined angle in a left-right direction, an upper-lower direction, or both with respect to a front direction. That is, the threshold setting unit 30 according to the example embodiment may partition a left-right region of an imaginary line along a front direction into a safe zone SZ and a inattentive zone CZ based on an angle in a left-right direction with respect to the imaginary line, and/or partition an upper-lower region of the imaginary line into a second safe zone SZ and a second inattentive zone CZ based on an angle in an upper-lower direction with respect to the imaginary line. The front direction may be a direction in which the driver is facing.

Figure 2:
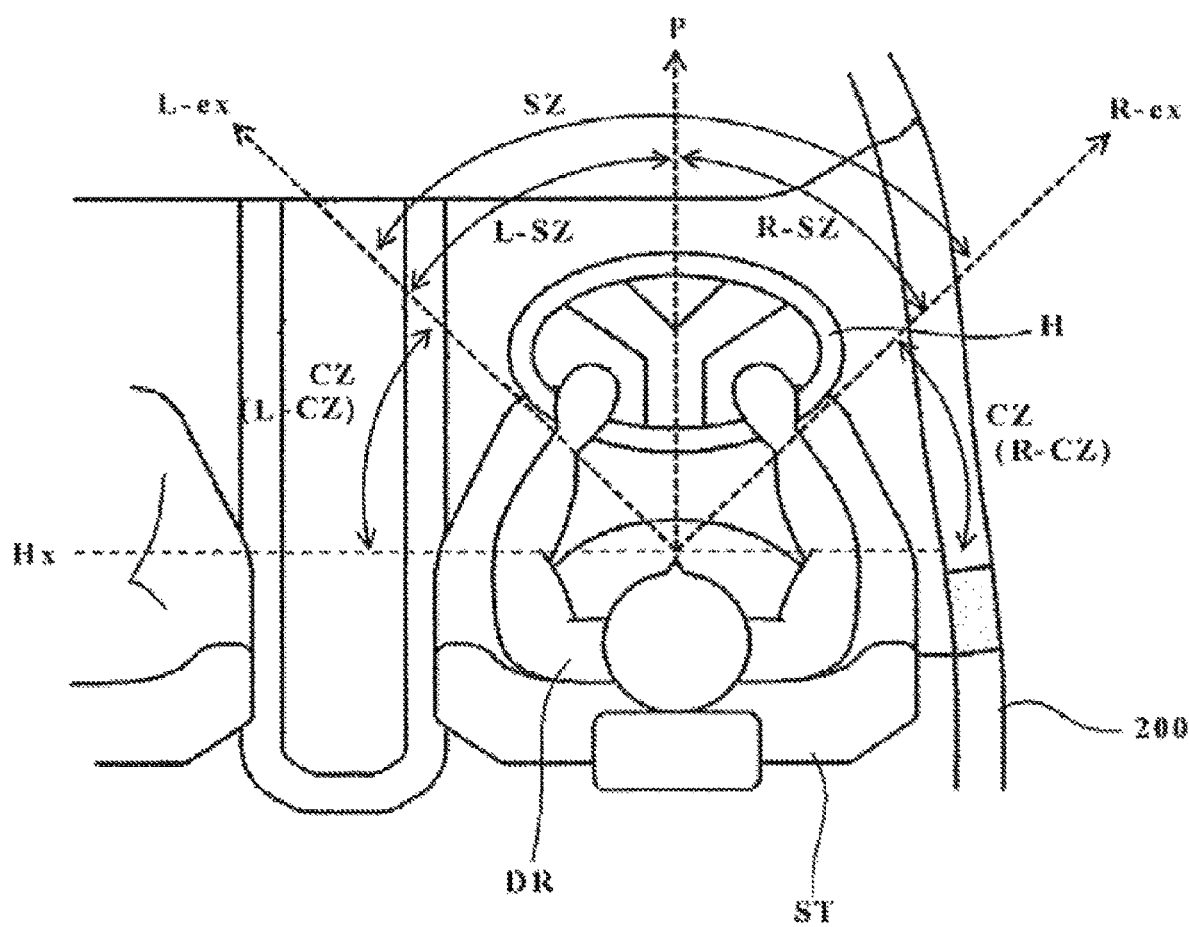
FIG. 2 is a schematic diagram illustrating examples of a safe zone and an inattentive zone of a sight line and a direction of a face of a driver in a left-right direction.
Figure 3:
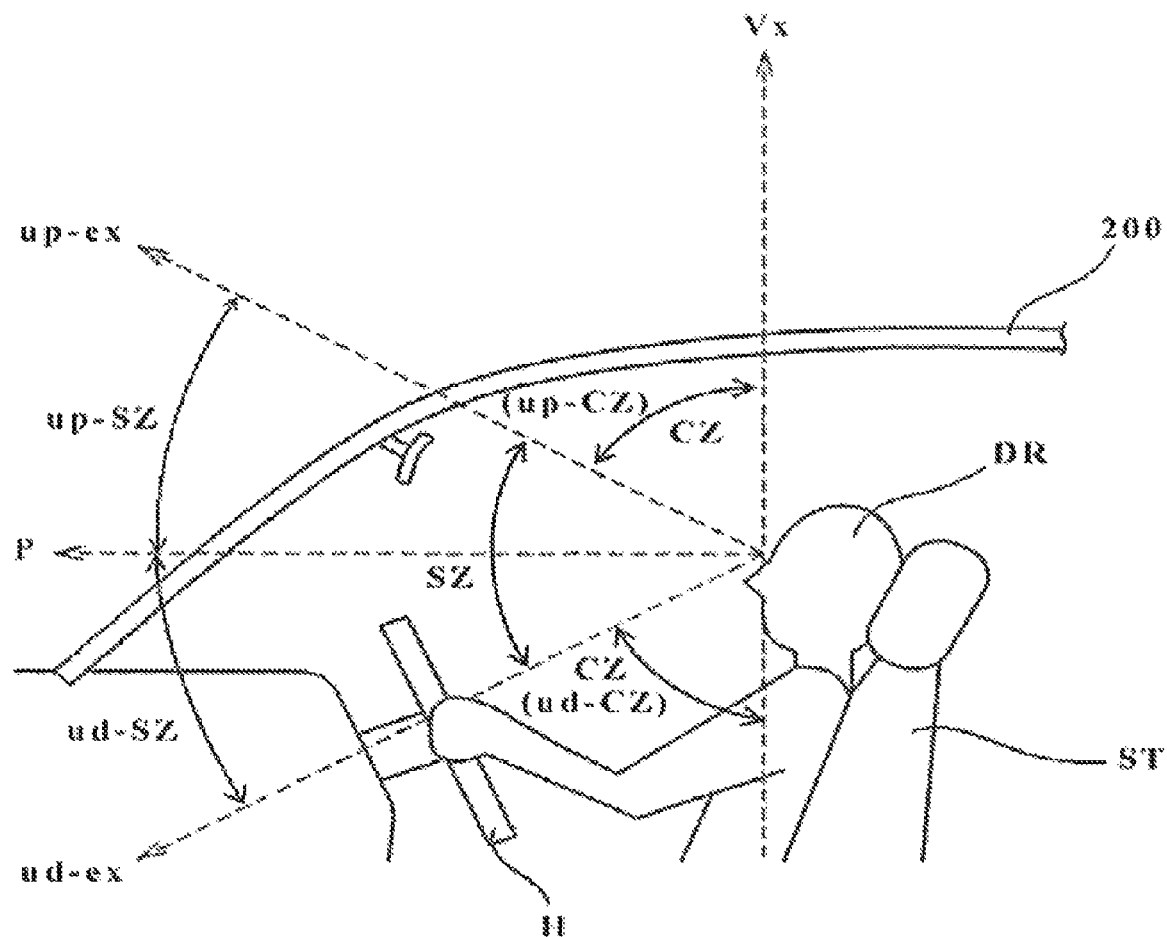
FIG. 3 is a schematic diagram illustrating examples of the safe zone and the inattentive zone of the sight line and the direction of the face of the driver in an upper-lower direction.

FIG. 2 illustrates examples of the safe zone SZ and the inattentive zone CZ of the sight line of a driver DR in the left-right direction. FIG. 3 illustrates examples of the safe zone SZ and the inattentive zone CZ of the sight line of the driver DR in the upper-lower direction. The following description refers to a case where the safe zone SZ and the inattentive zone CZ are each set on the basis of the sight line of the driver DR; however, this is non-limiting. It is needless to say that, in one example, the direction of the face of the driver DR may be detected to set each of the safe zone SZ and the inattentive zone CZ on the basis of the direction of the face of the driver DR in place of the sight line in a similar manner.

Referring to FIG. 2, the driver DR sitting on a seat ST of the vehicle 200 may be operating a steering wheel H while looking in a front direction P to drive the vehicle 200. According to the example embodiment, the safe zone SZ may be defined to have a predetermined angle in the left-right direction with respect to the front direction P. The inattentive zone CZ may be set in a range that is outside the safe zone SZ and is from the border to a horizontal axis Hx. That is, a left inattentive zone L-CZ may be set in a range that is outside the safe zone SZ and is from a border L-ex to the horizontal axis Hx, and a right inattentive zone R-CZ may be set in a range that is outside the safe zone SZ and is from a border R-ex to the horizontal axis Hx. The imaginary line may be set along the front direction P.

Accordingly, for example, in a case where the sight line of the driver DR falls within the safe zone SZ, it may be determined that there is no or less risk of the occurrence of the dangerous driving. In a case where the sight of line of the driver DR stays in the inattentive zone CZ outside the determination threshold (the border described above) for a predetermined time period or more, it may be determined that the dangerous driving is occurring.

In one embodiment, the borders between the safe zone SZ and the inattentive zone CZ, i.e., the borders L-ex and R-ex, may serve as a "determination threshold". Note that an end of the inattentive zone CZ may be positioned not on the horizontal axis Hx but on the rear side of the driver DR.

According to the example embodiment, the safe zone SZ may be defined as a region within which the driver DR is allowed to keep his or her sight line as long as the sight line of the driver DR is not excessively concentrating on a particular point therein. The safe zone SZ may be divided into two regions with respect to the front direction P, i.e., a right safe zone R-SZ and a left safe zone L-SZ. Note that a specific angle of the safe zone SZ described above may be varied depending on a factor such as a type of the vehicle (a sedan, an SUV, a mini-sized vehicle, etc.), a position of a pillar, or a size of the pillar, and may be set on the basis of experiments or simulations.

In contrast, the inattentive zone CZ may be defined as follows: if the driver DR keeps his or her sight line within the inattentive zone CZ, a risk of accident generally increases. Note that a specific angle of the inattentive zone CZ described above may be varied depending on a factor such as a type of the vehicle (a sedan, an SUV, a mini-sized vehicle, etc.), a position of a pillar, or a size of the pillar, and may also be set on the basis of experiments or simulations.

According to the example embodiment, the safe zone SZ and the inattentive zone CZ may be continuous regions on the one side and on the other side of the border ex; however, this is non-limiting. In one example, a buffer region that is allowed to be included in either of the safe zone SZ and the inattentive zone CZ may be provided between the safe zone SZ and the inattentive zone CZ. In a case where such a buffer region is provided, for example, if the sight line of the driver DR moves from the inattentive zone CZ into the buffer region and returns to the inattentive zone CZ again, the time period in which the state value of the driver DR stays in the inattentive zone CZ calculated in later-described Step 5 may be a sum of a time period in which the state value of the driver DR stays in the inattentive zone CZ before the state value of the driver DR moves to the buffer region and a time period in which the state value of the driver DR stays in the inattentive zone CZ after the state value of the driver moves to the buffer region and returns to the inattentive zone CZ.

Referring to FIG. 3, the driver DR sitting on the seat ST of the vehicle 200 may be operating the steering wheel H while looking in the front direction P to drive the vehicle 200. According to the example embodiment, the safe zone SZ may be defined to have a predetermined angle in the upper-lower direction with respect to the front direction P. That is, an upper safe zone up-SZ and a lower safe zone ud-SZ may be provided. The inattentive zone CZ may be set in a range that is outside the safe zone SZ and is from the border to a vertical axis Vx. That is, an upper inattentive zone up-CZ may be set in a range that is outside the safe zone SZ and is from a border up-ex to the vertical axis Vx, and a lower inattentive zone ud-CZ may be set in a range that is outside the safe zone SZ and is from a border ud-ex to the vertical axis Vx. Note that an end of the inattentive zone CZ may be positioned not on the vertical axis Vx but on the rear side of the driver DR.

In one embodiment, the threshold changing unit 40 may serve as a "determination threshold changing processor". The threshold changing unit 40 may change the one or more determination thresholds on the basis of a result of the detection of the road-surface state performed by the road-surface-state detector 20 described above. For example, the threshold changing unit 40 according to the example embodiment may change the position of the above-described border in accordance with the road-surface state.

Figure 5:
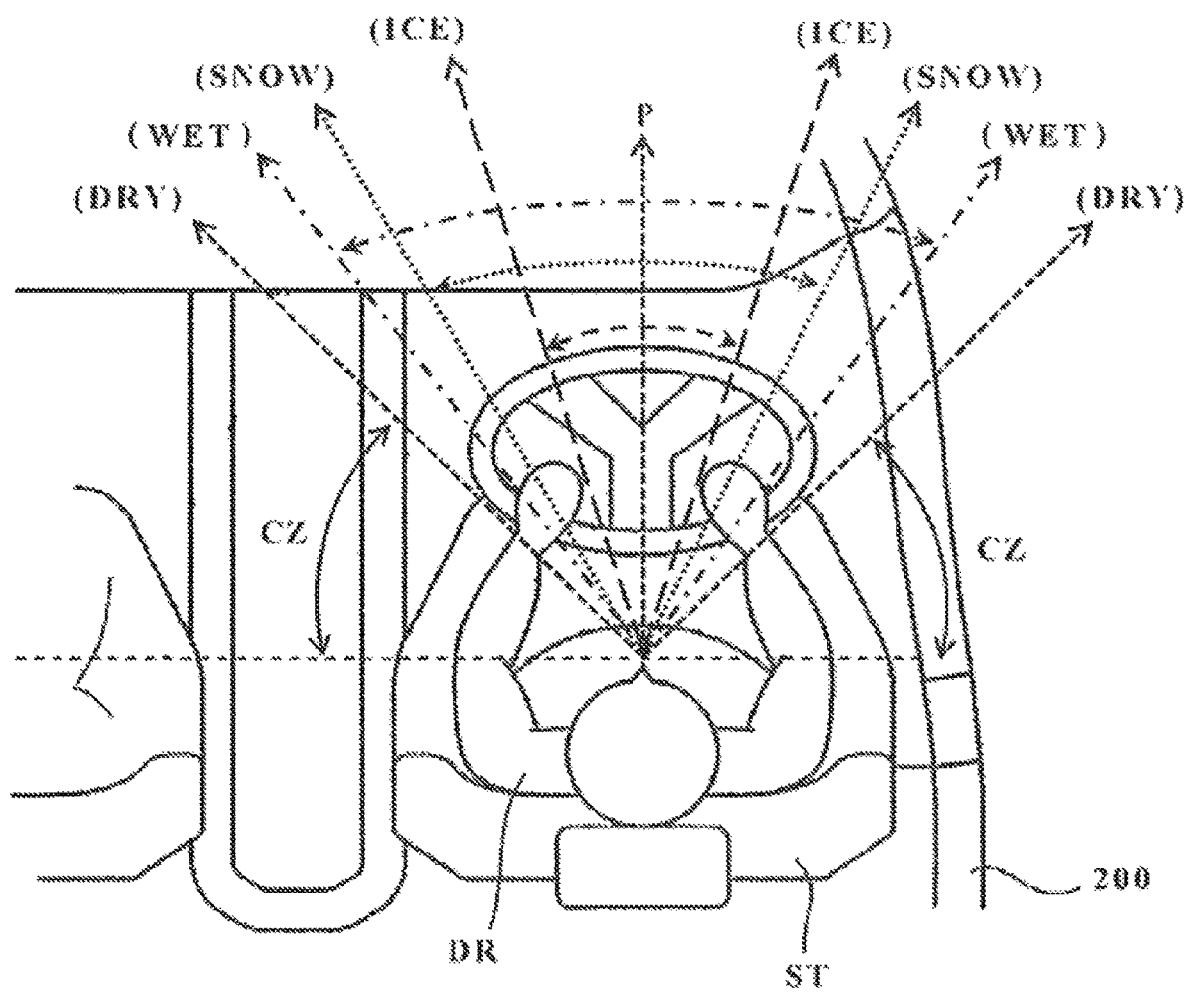
FIG. 5 is a schematic diagram illustrating example 1 of setting the safe zone and the inattentive zone in accordance with a traveling environment.
Figure 6:
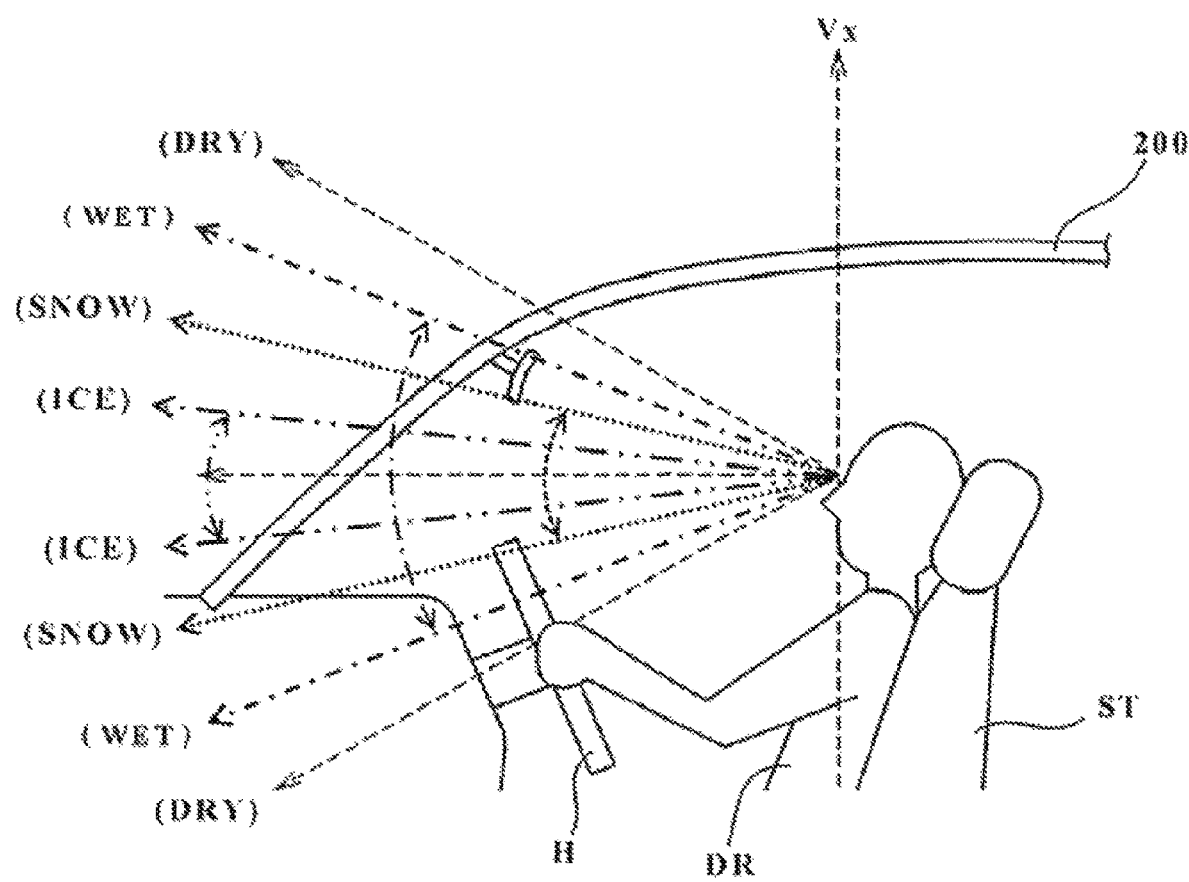
FIG. 6 is a schematic diagram illustrating example 2 of setting the safe zone and the inattentive zone in accordance with the traveling environment.

FIGS. 5 and 6 each illustrate an example of changing the determination threshold in accordance with the traveling environment to be executed by the threshold changing unit 40. FIG. 5 illustrates an example of changing the determination threshold in the left-right direction. FIG. 6 illustrates an example of changing the determination threshold in the upper-lower direction.

Referring to FIG. 5, the road-surface-state detector 20 may detect which of the four types of states (DRY, WET, SNOW, and ICE) corresponds to the road-surface state of the traveling environment of the vehicle 200. In a case where the road-surface-state detector 20 determines that the road-surface state of the traveling environment of the vehicle 200 is of the DRY type, the threshold changing unit 40 may perform a control to set the borders ex at the respective positions indicated by "(DRY)".

For example, in a case where the weather changes to rainy weather, for example, after traveling through a tunnel, the road-surface-state detector 20 may determine that the road-surface state of the traveling environment of the vehicle 200 is of the WET type. In accordance therewith, the threshold changing unit 40 may change the positions of the borders ex to the respective positions indicated by "(WET)". Thus, for example, in a case of sunny weather (in a case where the road-surface state of the traveling environment is of the DRY type), even if the sight line of the driver DR moves a little in the left-right direction, the sight line of the driver DR may fall within the safe zone SZ, preventing such movement of the sight line from being determined as occurrence of the dangerous driving.

In contrast, for example, in a case where the traveling environment changes as described above, the safe zone SZ may be relatively reduced to a smaller range. Accordingly, a certain position of the sight line of the driver DR may not be determined as occurrence of the dangerous driving in the case where the road-surface state of the traveling environment is of the DRY type but may be determined as the dangerous driving after the traveling environment has changed in some cases. According to the example embodiment, the state to be determined as the dangerous driving may change in accordance with the traveling environment as described above. It is therefore possible to give an appropriate warning to the driver DR in accordance with the environment.

The example of changing the determination threshold in the upper-lower direction may be similar to the example of changing the determination threshold in the left-right direction, and a description thereof is therefore omitted.

The threshold changing unit 40 may cause a range of a left safe zone L-SZ and a range of a right safe zone R-SZ from each other on the basis of the road-surface state described above. The left safe zone L-SZ may be a region, of the safe zone SZ, positioned on a left side of the driver DR. The right safe zone R-SZ may be a region, of the safe zone SZ, positioned on a right side of the driver DR. For example, in a right-hand drive vehicle, it may be more difficult for the driver DR to view the left side than to view the right side in some cases. In such a case, for example, the threshold changing unit 40 may perform a control of changing the range of the right safe zone R-SZ in accordance with the road-surface state and set a constant range for the left safe zone L-SZ independently of the road-surface state. In other words, the threshold changing unit 40 may not change the border ex for the left safe zone L-SZ.

In one example, the threshold changing unit 40 may change the determination threshold to cause a value of the determination threshold corresponding to a turning side and a value of the determination threshold corresponding to a side opposite to the turning side to be different from each other in a case where the vehicle 200 is turning. The turning side may be a side toward which the vehicle 200 is turning. For example, in a case where the driver DR turns the steering wheel H to the right and thereby causes the vehicle 200 to turn right, it is assumable that it is favorable for the driver DR to confirm safety of a wider range on the right compared to the left. In such a case, for example, the threshold changing unit 40 may perform a control of changing the range of the left safe zone L-SZ in accordance with the road-surface state and set a constant range for the right safe zone R-SZ independently of the road-surface state. In other words, the threshold changing unit 40 may not change the border ex for the right safe zone R-SZ.

In another example, the threshold changing unit 40 may change the determination threshold to cause the determination threshold in a case where the vehicle 200 is traveling on a highway and the determination threshold in a case where the vehicle 200 is traveling on an ordinary road to be different from each other. For example, in the case where the vehicle 200 is traveling on a highway, a stopping distance may be longer than that in the case where the vehicle 200 is traveling on an ordinary road. In other words, it may be favorable to enhance safety in the case the vehicle 200 is traveling on a highway, as compared with the case where the vehicle 200 is traveling on an ordinary road. Accordingly, for example, the threshold changing unit 40 may perform a control of not changing the border ex in a case where it is determined that the vehicle 200 is traveling on an ordinary road on the basis of the data supplied from a device such as the navigation device NS, and changing the border ex in a case where it is determined that the vehicle 200 is traveling at a high speed on a road such as a highway.

In one embodiment, the danger determination unit 50 may serve as a "dangerous driving determination processor". The danger determination unit 50 may determine that the dangerous driving is occurring in a case where the state value (the sight line, the direction of the face, the heart rate, the number of blinking, etc. described above) of the driver DR is present within a range outside the determination threshold for a predetermined time period. For example, the danger determination unit 50 according to the example embodiment may determine that the dangerous driving is occurring in a case where the state value of the driver DR described above stays in the inattentive zone CZ outside the determination threshold for a predetermined time period or more.

As an example, FIGS. 7 and 8 each illustrate a relationship between the state value of the driver DR and the determination threshold. FIG. 7 illustrates an example of a determination threshold table related to the sight line or the direction of the face of the driver DR in which the determination thresholds are to be selected in accordance with the road-surface state. FIG. 8 illustrates an example of a determination threshold table related to the heart rate or the number of blinking of the driver DR in which the determination thresholds are to be selected in accordance with the road-surface state.

That is, the table illustrated in FIG. 7 may describe the safe zone SZ of the sight line of the driver DR set in accordance with the traveling environment. In this example, the angle of the sight line of the driver DR in each of the left-right direction and the upper-lower direction corresponding to the safe zone SZ may be defined. For example, in a case where the road-surface state of the traveling environment is of the SNOW type, the danger determination unit 50 may determine that the sight line of the driver DR is within the safe zone SZ in a case where the sight line of the driver DR is within a range of ±15° with respect to the front direction P in the left-right direction. For example, in a case where the road-surface state of the traveling environment is of the DRY type, the danger determination unit 50 may determine that the sight line of the driver DR is within the inattentive zone CZ in a case where the sight line of the driver DR is outside a range of ±20° with respect to the front direction P in the upper-lower direction.

In a case where the heart rate or the number of blinking is used as the state value of the driver DR, the determination threshold table such as that illustrated in FIG. 8 as an example may be stored in advance in the storage device MR. Further, the heart rate or the number of blinking of the driver DR may be measured while the vehicle 200 is traveling, for example, by a device such as an unillustrated known pulsimeter mounted on the steering wheel H or the vehicle inside camera $VR_2$.

In addition, in a case where the road-surface state of the traveling environment is of the WET type, the danger determination unit 50 may determine that the heart rate of the driver DR falls within the inattentive zone CZ in a case where the measured heart rate of the driver DR is outside a range of ±15% with respect to a reference value T. For example, in a case where the road-surface state of the traveling environment is of the ICE type, the danger determination unit 50 may determine that the number of blinking of the driver DR falls within the safe zone SZ in a case where the measured number of blinking of the driver DR is within a range of ±5% with respect to the reference value T.

Note that the method of setting the reference value T of the heart rate or the number of blinking described above is not particularly limited, and any of various known methods may be applicable. In one example, an average value of values measured within several minutes from the time when the driver DR gets in the vehicle 200 may be set as the reference value T. In another example, the driver DR may input the reference value T by means of the display DP.

The presentation unit 60 may give the driver DR a warning indicating the occurrence of the dangerous driving determined by the danger determination unit 50. For example, the presentation unit 60 may give the driver DR the warning indicating the occurrence of the dangerous driving by means of a device such as the display DP or the speaker SP described above. Note that the presentation unit 60 may select the method of giving the warning of the occurrence of the dangerous driving from a method using both an audio and an image, a method using only one of the audio and the image, and a method not using the audio or the image but merely recording the occurrence of the dangerous driving in the storage device MR.

Figure 9:
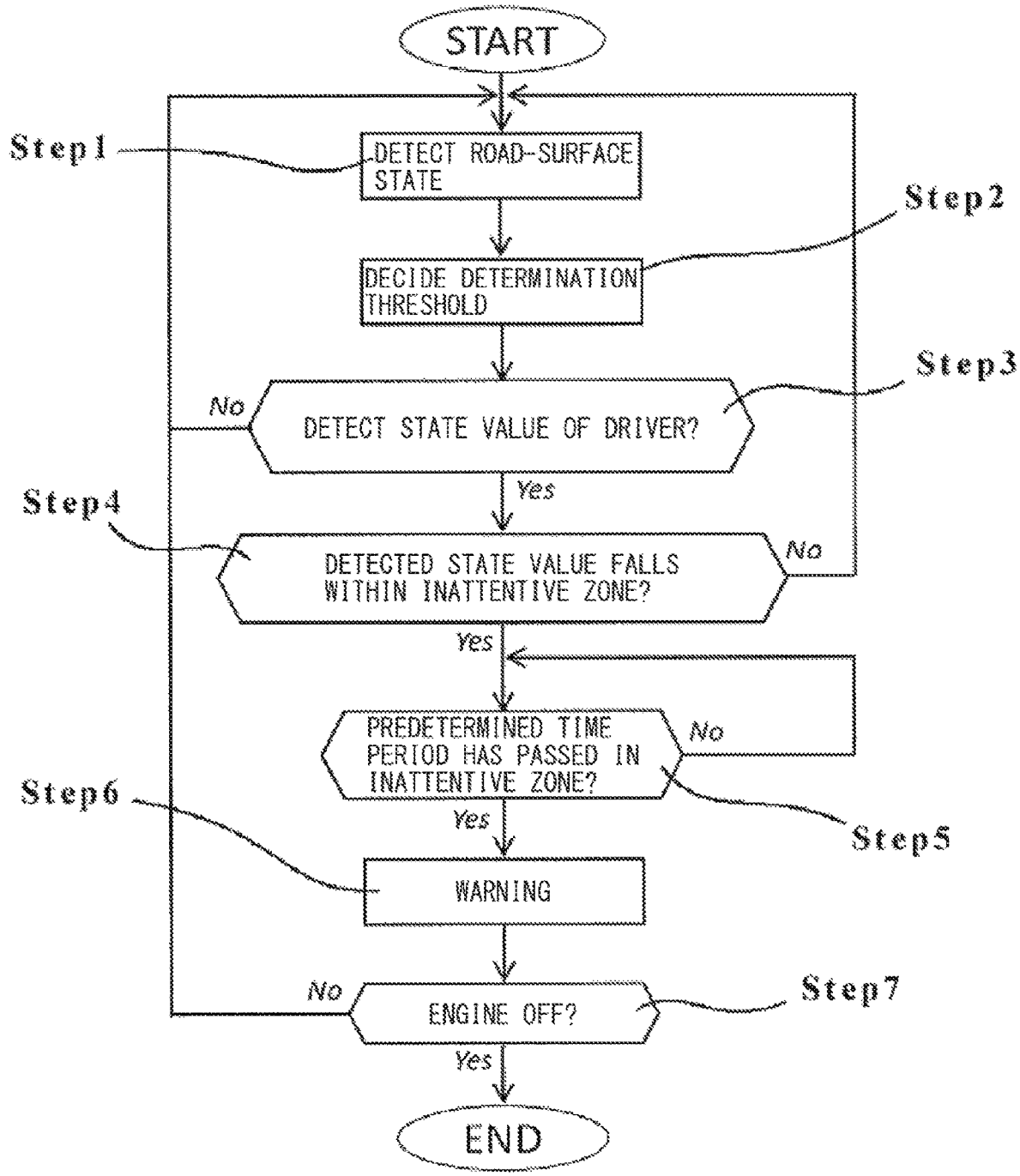
FIG. 9 is a flowchart illustrating an example of a method of determining occurrence of dangerous driving with presenting occurrence or non-occurrence of the dangerous driving to the driver.

Next, referring also to FIG. 9, a description is given of a method of determining the occurrence of the dangerous driving with presenting occurrence or non-occurrence of the dangerous driving to the driver DR. The method may be executed by the control apparatus 100 of the example embodiment.

First, in Step 1, the road-surface-state detector 20 may detect the road-surface state of the road surface on which the vehicle 200 travels. In one embodiment, the road-surface-state detector 20 may serve as the "road-surface-state detection processor". Assume a case where the road-surface-state detector 20 measures the traveling environment with use of a device such as the sensors or the friction coefficient measurement device described above, and determines that the road-surface state is of the "WET" type, for example.

Thereafter, in Step 2, the threshold setting unit 30 may refer to the determination threshold table stored in the storage device MR, and set the border ex corresponding to the "WET" type. In one embodiment, the threshold setting unit 30 may serve as the "threshold setting processor". On this occasion, in a case where the heart rate or the number of blinking is used as the state value of the driver DR, the threshold setting unit 30 may refer to the determination threshold table stored in the storage device MR in a similar manner, and set the border ex for the heart rate or the number of blinking corresponding to the "WET" type.

Thereafter, in Step 3, the driver state-value detector 10 may detect the state value of the driver DR. In one embodiment, the driver state-value detector 10 may serve as the "driver state-value detection processor". As the state value of the driver DR, for example, one or more of the sight line, the direction of the face, the heart rate, and the number of blinking may be used. In this example, the driver state-value detector 10 may detect the sight line of the driver DR as an example of the state value of the driver DR. In a case where the driver state-value detector 10 fails to detect the state value of the driver DR (No in Step 3), the process may be caused to return to Step 1 and the above-described processes may be performed again.

In a case where the driver state-value detector 10 succeeds to detect the state value (in this example, the sight line) of the driver DR (Yes in Step 3), the process may be caused to proceed to Step 4. In Step 4, it is determined whether the detected state value of the driver DR falls within the inattentive zone CZ. In a case where the detected state value of the driver DR does not fall within the inattentive zone CZ (No in Step 4), the process may be caused to return to Step 1 and the above-described processes may be performed again.

In a case where the detected state value of the driver DR falls within the inattentive zone CZ in Step 4 (Yes in Step 4), the process may be caused to proceed to Step 5. In Step 5, it may be determined whether the state value of the driver DR is present within the inattentive zone CZ for a predetermined time period or more on the basis of time measurement performed by a device such as an unillustrated known timer. Note that the predetermined time period related to the time period of the state value staying within the inattentive zone CZ is not particularly limited as long as not departing from the gist of the embodiment. For example, the predetermined time period may be appropriately set to several seconds.

For example, in a case where the sight line of the driver DR returns to the safe zone SZ, the measurement of time period performed by the device such as the timer may be reset. In a case where the above-described buffer region is set and where the sight line of the driver DR moves from the inattentive zone CZ into the buffer region and returns to the inattentive zone CZ, the measurement of the time period performed by the device such as the timer may be restarted from the time period measured when the driver DR has previously moved from the inattentive zone CZ to the buffer region.

In a case where it is determined that the state value of the driver DR does not stay within the inattentive zone CZ for the predetermined time period or more on the basis of the time measurement performed by the device such as the timer (No in Step 5), the process in Step 5 may be repeated until the state value of the driver DR stays within the inattentive zone CZ for the predetermined time period. In a case where it is determined that the state value of the driver DR stays within the inattentive zone CZ for the predetermined time period or more on the basis of the time measurement performed by the device such as the timer in step 5 (Yes in Step 5), the process may be caused to proceed to Step 6. In Step 6, the presentation unit 60 may give the driver DR a warning by means of the presentation device DS.

Thereafter, in Step 7, it may be determined whether an engine is turned off. In a case where it is determined that the engine is turned off (Yes in Step 7), the process may be brought to an end. In a case where it is determined that the engine is not turned off, i.e., that the vehicle 200 is still traveling (No in Step 7), the process may be caused to return to Step 1 and the above-described processes may be performed again. Accordingly, for example, in a case where the weather changes from rainy weather to sunny weather while the vehicle 200 is traveling, the road-surface-state detector 20 may determine that the road-surface state is of the "DRY" type and the subsequent processes may be performed.

According to the control apparatus 100 of the vehicle 200 and the method of determining the occurrence of the dangerous driving of the example embodiment described above, it is possible to appropriately present occurrence or non-occurrence of the dangerous driving to the driver in accordance with various traveling environments.

Although some embodiments of the technology have been described in the foregoing by way of example with reference to the accompanying drawings, the technology is by no means limited to the embodiments described above. It is apparent to a person skilled in the art to modify the embodiments described above. It should be understood that such modifications are included in the technical scope of the technology.

Each of the control apparatus 100, the driver state-value detector 10, the road-surface-state detector 20, the threshold setting unit 30, the threshold changing unit 40, the danger determination unit 50, and the presentation unit 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the control apparatus 100, the driver state-value detector 10, the road-surface-state detector 20, the threshold setting unit 30, the threshold changing unit 40, the danger determination unit 50, and the presentation unit 60 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the control apparatus 100, the driver state-value detector 10, the road-surface-state detector 20, the threshold setting unit 30, the threshold changing unit 40, the danger determination unit 50, and the presentation unit 60 illustrated in FIG. 1.

The invention claimed is:

1. A vehicle control apparatus to be applied to a vehicle, the vehicle control apparatus comprising:
   a driver state-value detection processor configured to detect a state value of a driver who drives the vehicle;
   a road-surface-state detection processor configured to detect a road-surface state of a road on which vehicle is traveling based on information received from sensors mounted on the vehicle, the information including a road-surface temperature, a road-surface roughness and a road-surface moisture;
   a threshold setting processor configured to set a safe zone for the state value of the driver based on one or more determination thresholds;
   a dangerous-driving determination processor configured to determine that a dangerous driving is occurring in a case where the state value of the driver is present within a range outside of the safe zone for a predetermined time period or more; and
   a determination threshold changing processor configured i) to change the one or more determination thresholds on a basis of the road-surface state in a case where the vehicle is traveling on a highway and ii) to fix the one or more determination thresholds in a case where the vehicle is not traveling on the highway.

2. The vehicle control apparatus according to claim 1,
   wherein the road-surface-state detection processor is configured to determine which of a first state, a second state and third state corresponds to the road surface state, and
   wherein the determination threshold changing processor is configured to:
      in response to a determination that the first state corresponds to the road surface state, set the one or more determination thresholds so that the safe zone is a first range,
      in response to a determination that the second state corresponds to the road surface state, set the one or more determination thresholds so that the safe zone is a second range that is narrower than the first range, and
      in response to a determination that the third state corresponds to the road surface state, set the one or more determination thresholds so that the safe zone is a third range that is narrower than the second range.

3. The vehicle control apparatus according to claim 2,
   wherein the second state is a road surface state in which a friction coefficient of the road surface is lower than the first state, and
   wherein the third state is a road surface state in which the friction coefficient of the road surface is lower than the second state.

4. The vehicle control apparatus according to claim 3, wherein the driver state-value detection processor is configured to detect a heart rate of the driver or number of blinking by the driver as the state value of the driver.

5. The vehicle control apparatus according to claim 3,
   wherein the driver state-value detection processor is configured to detect left-right angle of a sight line of the driver with respect to a front direction of the vehicle as the state value of the driver,
   wherein the one or more determination thresholds includes a first threshold and a second threshold, the first threshold is a predetermined angle to a right direction from the front direction, the second threshold is a predetermined angle to a left direction from the front direction,
   wherein the threshold setting processor is configured to set a range from the first threshold to the second threshold as the safe zone, and
   wherein the determination threshold changing processor is configured to change the first threshold based on the road-surface state and to fix the second threshold.

6. The vehicle control apparatus according to claim 3,
   wherein the driver state-value detection processor is configured to detect left-right angle of a sight line of the driver with respect to a front direction of the vehicle as the state value of the driver,
   wherein the one or more determination thresholds includes a first threshold and a second threshold, the first threshold is a predetermined angle to a right direction from the front direction, the second threshold is a predetermined angle to a left direction from the front direction,
   wherein the threshold setting processor is configured to set a range from the first threshold to the second threshold as the safe zone, and
   wherein when the vehicle is turning right, the determination threshold changing processor is configured to change the second threshold based on the road-surface state and to fix the first threshold.

7. The vehicle control apparatus according to claim 3,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein the determination threshold changing processor is configured i) to change the first and second thresholds based on the road-surface state in the case where the vehicle is traveling on the highway and ii) to fix the first and second thresholds in the case where the vehicle is not traveling on the highway.

8. The vehicle control apparatus according to claim 2, wherein the driver state-value detection processor is configured to detect a heart rate of the driver or number of blinking by the driver as the state value of the driver.

9. The vehicle control apparatus according to claim 2,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein the determination threshold changing processor is configured to change the first threshold based on the road-surface state and to fix the second threshold.

10. The vehicle control apparatus according to claim 2,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein when the vehicle is turning right, the determination threshold changing processor is configured to change the second threshold based on the road-surface state and to fix the first threshold.

11. The vehicle control apparatus according to claim 2,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein the determination threshold changing processor is configured i) to change the first and second thresholds based on the road-surface state in the case where the vehicle is traveling on the highway and ii) to fix the first and second thresholds in the case where the vehicle is not traveling on the highway.

12. The vehicle control apparatus according to claim 1, wherein the driver state-value detection processor is configured to detect a heart rate of the driver or number of blinking by the driver as the state value of the driver.

13. The vehicle control apparatus according to claim 1,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein the determination threshold changing processor is configured to change the first threshold based on the road-surface state and to fix the second threshold.

14. The vehicle control apparatus according to claim 1,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein when the vehicle is turning right, the determination threshold changing processor is configured to change the second threshold based on the road-surface state and to fix the first threshold.

15. The vehicle control apparatus according to claim 1,
wherein the driver state-value detection processor is configured to detect left-right angle of a sight line of the driver with respect to a front direction of the vehicle as the state value of the driver,
wherein the one or more determination thresholds includes a first threshold and a second threshold, the first threshold is a predetermined angle to a right direction from the front direction, the second threshold is a predetermined angle to a left direction from the front direction,
wherein the threshold setting processor is configured to set a range from the first threshold to the second threshold as the safe zone, and
wherein the determination threshold changing processor is configured i) to change the first and second thresholds based on the road-surface state in the case where the vehicle is traveling on the highway and ii) to fix the first and second thresholds in the case where the vehicle is not traveling on the highway.

16. A vehicle control apparatus to be applied to a vehicle, the vehicle control apparatus comprising:
   circuitry configured to:
   detect a state value of a driver who drives the vehicle,
   detect a road-surface state of a road on which vehicle is traveling based on information received from sensors mounted on the vehicle, the information including a road-surface temperature, a road-surface roughness and a road-surface moisture,
   set a safe zone for the state value of the driver based on one or more determination thresholds,
   determine that a dangerous driving is occurring in a case where the state value of the driver is present within a range outside of the safe zone for a predetermined time period or more,
   change the one or more determination thresholds on a basis of the road-surface state in a case where the vehicle is traveling on a highway, and
   fix the one or more determination thresholds in a case where the vehicle is not traveling on the highway.

* * * * *